US010160293B2

United States Patent
Brinas (10) Patent No.: US 10,160,293 B2
(45) Date of Patent: Dec. 25, 2018

(54) AIRFLOW OUTLET

(71) Applicant: GM GLOBAL TECHNOLOGY OPERATIONS LLC, Detroit, MI (US)

(72) Inventor: Gerard Alan Brinas, Sterling Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 391 days.

(21) Appl. No.: 15/134,557

(22) Filed: Apr. 21, 2016

(65) Prior Publication Data

US 2017/0305238 A1   Oct. 26, 2017

(51) Int. Cl.
*B60H 1/34* (2006.01)
*B60H 1/00* (2006.01)
*B60H 1/24* (2006.01)

(52) U.S. Cl.
CPC ....... *B60H 1/3421* (2013.01); *B60H 1/00564* (2013.01); *B60H 1/242* (2013.01); *B60H 2001/3478* (2013.01)

(58) Field of Classification Search
CPC ... B60H 1/3421; B60H 1/00564; B60H 1/242
USPC .................................................. 454/152–155
See application file for complete search history.

(56) References Cited

U.S. PATENT DOCUMENTS

| 3,746,042 A * | 7/1973 | Finkel .................... F24F 13/14 137/601.06 |
| 2006/0057952 A1* | 3/2006 | Kim ..................... B60H 1/3428 454/155 |
| 2011/0319005 A1* | 12/2011 | Sawada .............. B60H 1/00678 454/155 |

FOREIGN PATENT DOCUMENTS

JP            58174011 A  * 10/1983  ......... B60H 1/00664

* cited by examiner

*Primary Examiner* — Vivek Shirsat
(74) *Attorney, Agent, or Firm* — Quinn IP Law (57) ABSTRACT

An airflow outlet is provided. The airflow outlet comprises at least a first housing, a second housing, a first shut-off door, a second shut-off door, and a control apparatus. The first housing defines an outlet opening and the second housing defines an inlet opening. The first housing and the second housing are operatively coupled and define a substantially closed airflow path between the inlet opening and the outlet opening. The first shut-off door is coupled to the second housing and rotatable about a first axis. The second shut-off door is coupled to the second housing and rotatable about a second axis. The first shut-off door and the second shut-off door are operatively configured to meter a flow of air through the inlet opening by occupying a selectable operating position. The control apparatus is configured to control the selectable operating position of the first shut-off door and the second shut-off door.

17 Claims, 5 Drawing Sheets

AIRFLOW OUTLET

TECHNICAL FIELD

The disclosure relates to an airflow outlet and airflow outlet controls, such as those used in vehicles, equipment, and the like. More particularly, the disclosure relates to an airflow outlet incorporated in the heating, ventilation, and air conditioning (HVAC) system of a vehicle.

BACKGROUND

Many passenger vehicles include airflow systems for passenger comfort within the interior passenger compartment. These airflow systems include heating, ventilation, and air conditioning (HVAC) systems that allow a vehicle passenger to control the temperature or adjust other settings of the interior passenger compartment. For instance, a fan or blower circulates conditioned air to the interior passenger compartment through one or more airflow outlets.

The amount of airflow and the direction of that airflow through the airflow outlets are generally manually controllable through the use of multiple sets of directional vanes, including at least a primary set of vanes and a secondary set of vanes. The vanes are generally controlled with thumb wheels or the like, to restrict, meter, or completely block airflow to the passenger compartment.

SUMMARY

An airflow outlet is provided. The airflow outlet may be configured for use within the HVAC system of a vehicle and designed to facilitate airflow to a vehicle passenger compartment. The airflow outlet comprises at least a first housing, a second housing, a first shut-off door, a second shut-off door, and a control apparatus.

The first housing defines an outlet opening, such that air passing through the outlet opening moves from the airflow outlet and into the passenger compartment. The second housing further defines an inlet opening, such that air passing through the inlet opening moves from an air duct and into the airflow outlet. The first housing and the second housing are operatively coupled and define a substantially closed airflow path between the inlet opening and the outlet opening.

The first shut-off door is coupled to the second housing and rotatable about a first axis. The second shut-off door is coupled to the second housing and rotatable about a second axis. The first shut-off door and the second shut-off door are operatively configured to meter a flow of air through the inlet opening and subsequently air flow along the airflow path and through the outlet opening, by occupying a selectable operating position.

The control apparatus is configured to control the selectable operating position of the first shut-off door and the operating position of the second shut-off door, such that a passenger or user may control or meter the airflow through the inlet opening and outlet opening and into the passenger compartment by positioning the first shut-off door and the second shut-off door in a desired or selected operating position via the control apparatus.

The above features and advantages and other features and advantages of the present invention are readily apparent from the following detailed description of the best modes for carrying out the invention when taken in connection with the accompanying drawings.

DETAILED DESCRIPTION

While the present disclosure may be described with respect to specific applications or industries, those skilled in the art will recognize the broader applicability of the disclosure. Those having ordinary skill in the art will recognize that terms such as "above," "below," "upward," "downward," et cetera, are used descriptively of the figures, and do not represent limitations on the scope of the disclosure, as defined by the appended claims. Any numerical designations, such as "first" or "second" are illustrative only and are not intended to limit the scope of the disclosure in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

Figure 1:
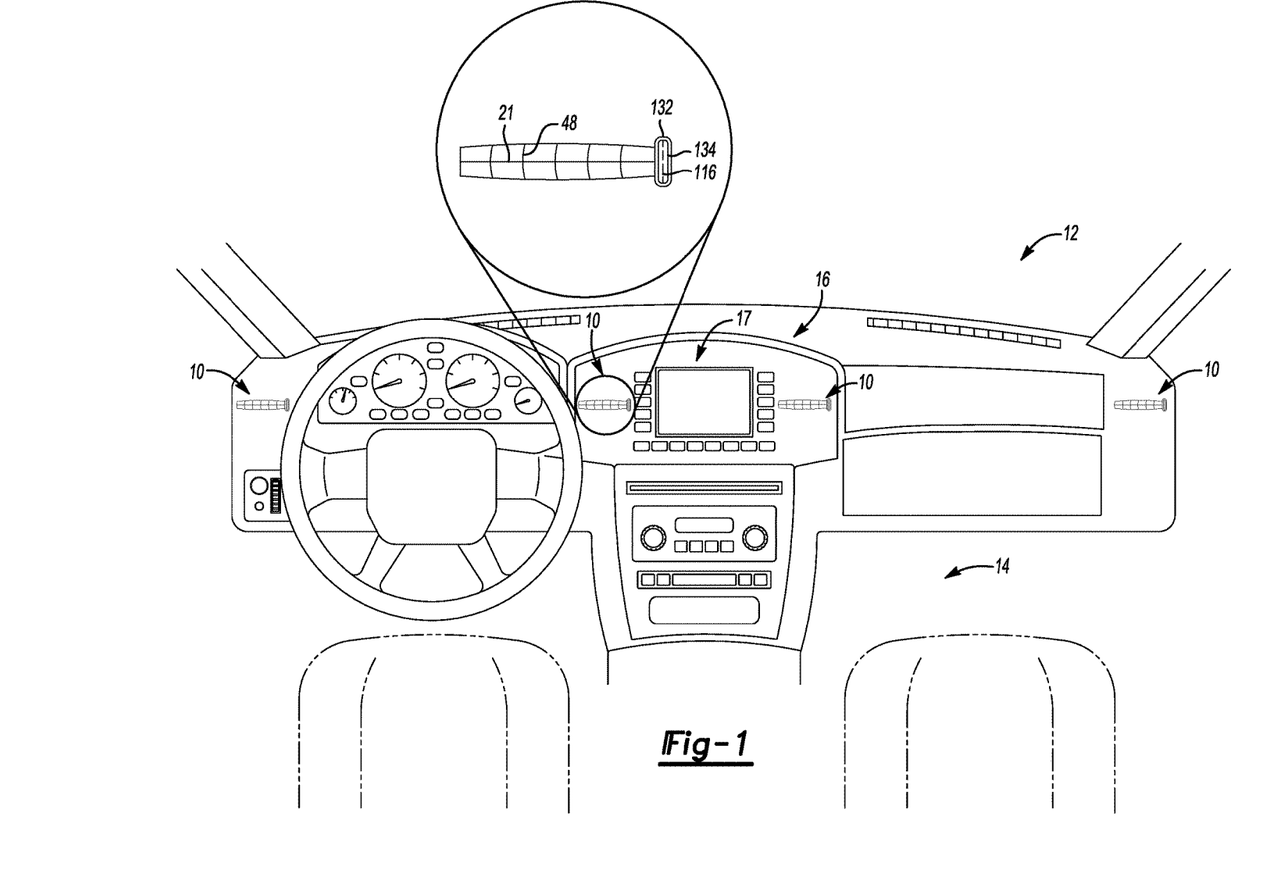
FIG. 1 is a schematic isometric view of an air vent positioned within a passenger compartment of a vehicle and usable with vehicle or other HVAC systems.

Referring to the Figures, wherein like reference numerals correspond to like or similar components throughout the several views, an airflow outlet 10 is provided. As shown in FIG. 1, the airflow outlet 10 may be configured for use within the HVAC system of a mobile platform and/or vehicle 12 having a passenger compartment 14. The mobile platform and/or vehicle 12 may include land vehicles such as, but not limited to, automobiles, all-terrain vehicles, train cars, enclosed golf cars, and the like. The mobile platform and/or vehicle 12 may include non-land vehicles such as, but not limited to, airplanes and personal and commercial watercraft.

A plurality of outlets 10 may be arranged throughout a passenger compartment 14 of the mobile platform and/or vehicle 12 in order to facilitate airflow to the passenger compartment 14. Only a portion of the mobile platform and/or vehicle 12, namely a dashboard 16 complete with an instrument panel 17, is shown schematically in FIG. 1 to illustrate the possible surroundings of the structures described herein.

Figure 2:
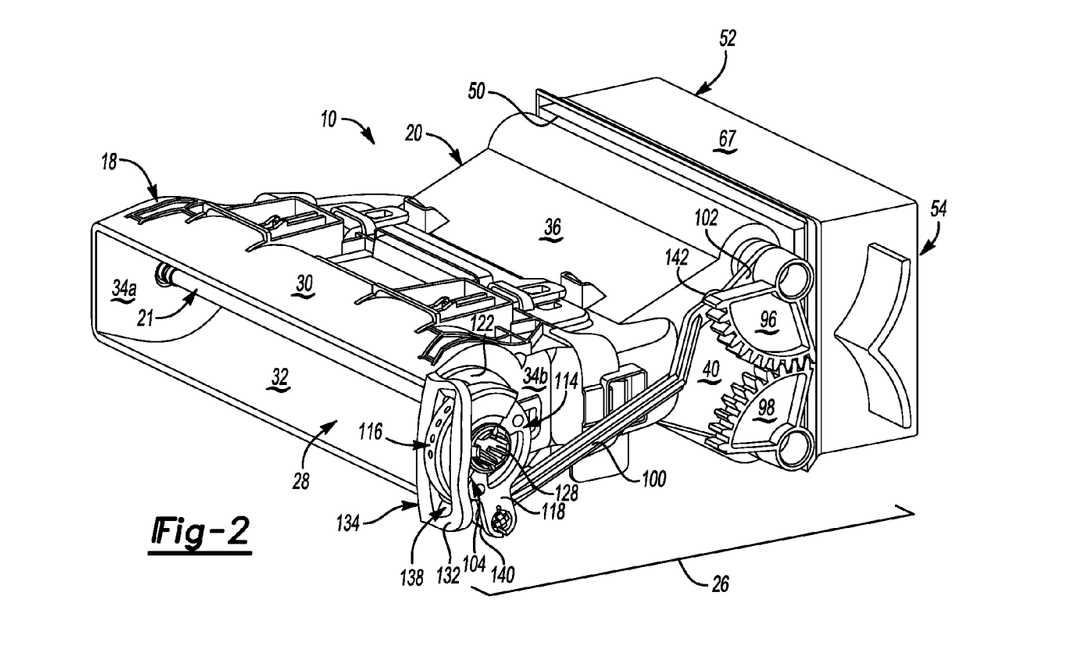
FIG. 2 is a schematic perspective view of the airflow outlet of the present disclosure.
Figure 3:
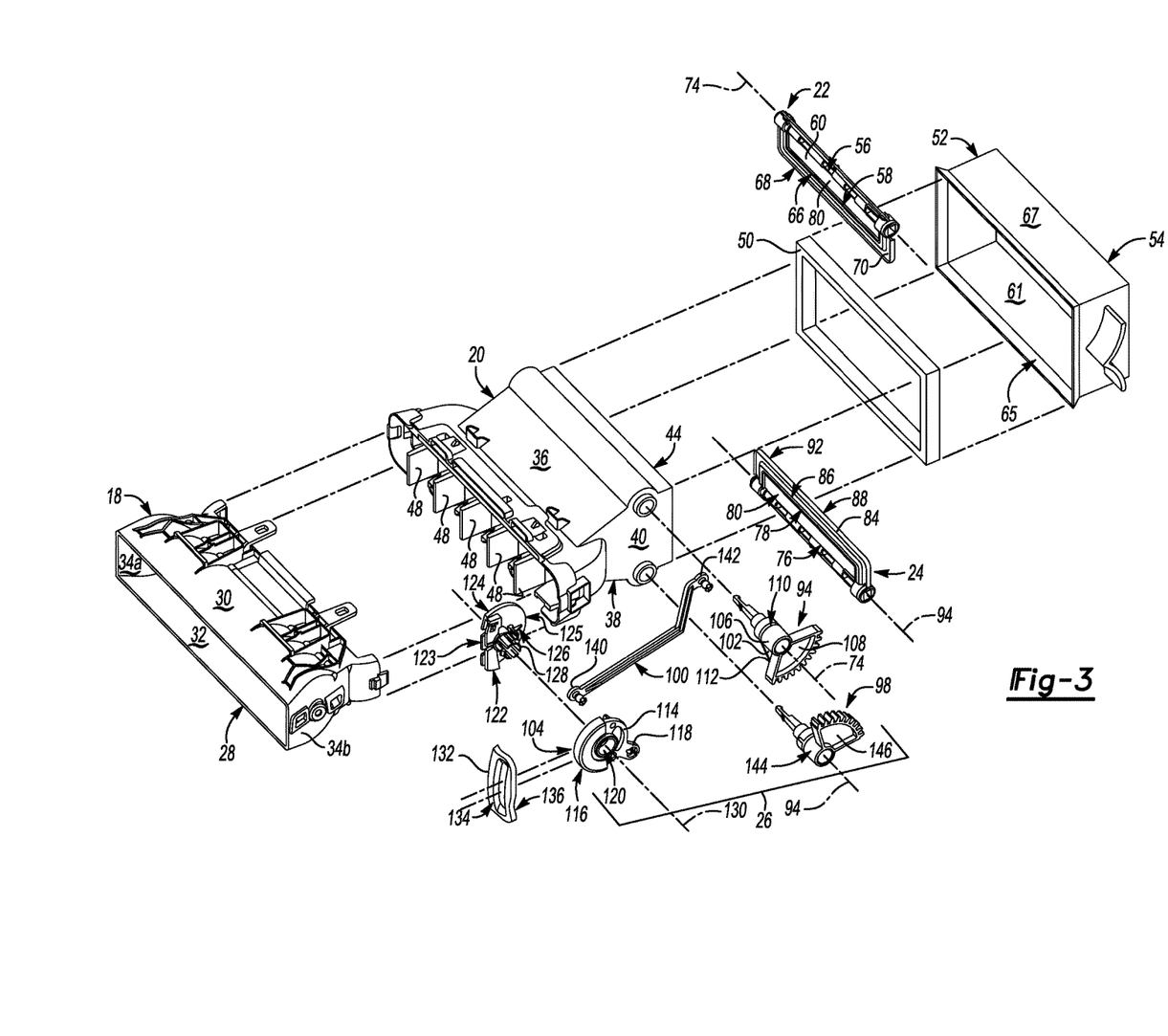
FIG. 3 is a schematic exploded perspective view of the airflow outlet of the present disclosure.

Referring to FIGS. 2 and 3, each airflow outlet 10 may generally include a first housing 18, a second housing 20, a first shut-off door 22, a second shut-off door 24, and a control apparatus 26.

The first housing 18 has a top 30, a bottom 32, and two opposing sides 34a, 34b. The first housing defines an outlet opening 28 bordered by and disposed between the top 30, the bottom 32, and the two opposing sides 34a, 34b. The first housing 18 may house at least one primary directional vane 21 therein. The at least one primary directional vane 21 is positioned longitudinally with respect to the outlet opening 28 and extends across the outlet opening 28.

Figure 5:
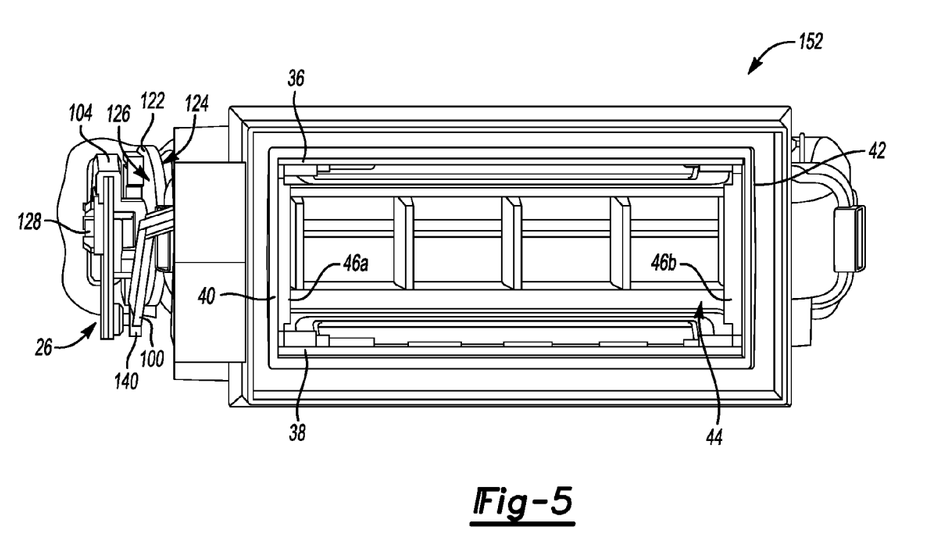
FIG. 5 is a schematic plan view of the airflow outlet of the present disclosure, wherein the first shutoff door and the second shutoff door occupy the first position.
Figure 8:
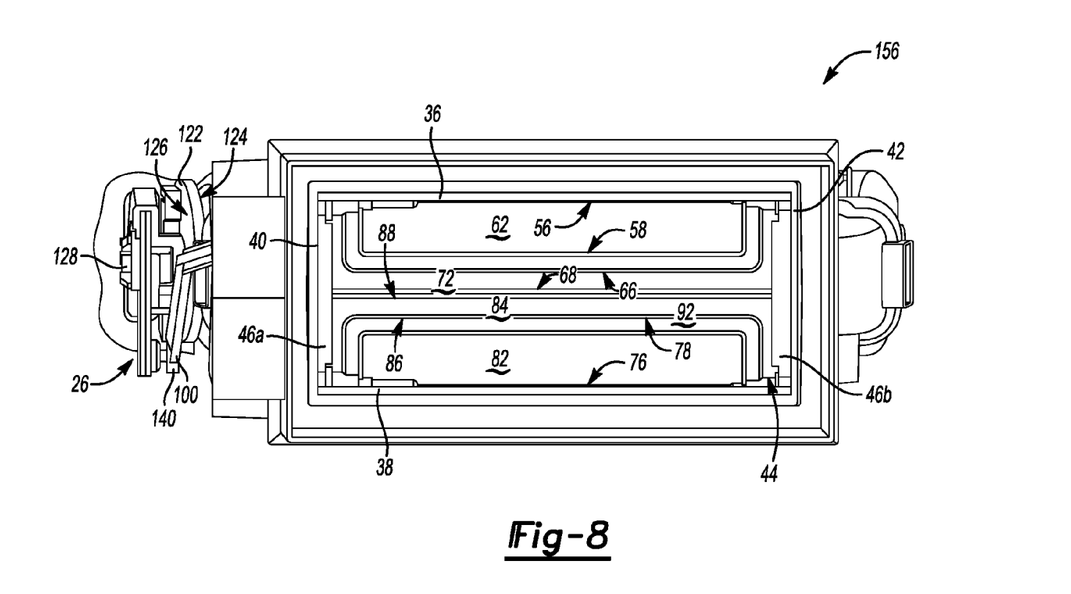
FIG. 8 is a schematic plan view of the airflow outlet of the present disclosure, wherein the first shutoff door and the second shutoff door occupy the third position.

The second housing 20 has a first wall 36, a second wall 38, a first side wall 40 and a second side wall 42. The first side wall 40 is positioned opposite the second side wall 42. The second housing 20 defines an inlet opening 44 bordered by and disposed between the first wall 36, the second wall 38, and the first and second side walls 40, 42. The second housing may further include a plurality of flange members 46a, 46b (FIGS. 5 and 8). At least one flange member 46a of the plurality of flange members 46a, 46b extends from the first side wall 40 and into the inlet opening 44. At least one flange member 46b of the plurality of flange members 46a, 46b extends from the second side wall 42 and into the inlet opening 44. The second housing 20 may further house a plurality of secondary directional vanes 48 therein. Each vane of the plurality of secondary directional vanes 48 may be longitudinally positioned between the first wall 36 and the second wall 38 of the second housing 20 and arranged in series between the first side wall 40 and the second side wall 42.

The first housing 18 and the second housing 20 are configured to be operatively coupled or fastened together. When coupled, the first housing 18 and the second housing 20 define a substantially closed airflow path between the inlet opening 44 and the outlet opening 28. The at least one primary directional vane 21 housed in the first housing 18 and the plurality of secondary directional vanes 48 housed in the second housing 20 cooperate to define an airflow direction through the airflow outlet 10. The primary directional vane 21 may direct airflow vertically or up or down within the passenger compartment 14. The plurality of secondary directional vanes 48 may direct airflow horizontally or across the passenger compartment 14.

The airflow outlet 10 may further include a trim piece 50 and a duct 52. The trim piece 50 and the duct 52 are configured to be operatively coupled to the second housing 20 at the inlet opening 44. The trim piece 50 is fitted about the exterior of the second housing 20, namely about the first wall 36, the second wall 38, the first side wall 40, and the second side wall 42 which define the inlet opening 44.

The duct 52 has a first side 61 or interior and a second side 67 or exterior. The duct 52 further defines a duct inlet 54 and a duct outlet 65. The duct 52 is configured to be coupled to the second housing 20 at the trim piece 50. The duct 52 is fitted about the trim piece 50 and the second housing 20 at the duct outlet 65, such that the duct 52, the second housing 20, and the first housing 18 are operatively coupled to define a substantially closed airflow path between the duct inlet 54 and the outlet opening 28.

Referring to FIGS. 3-8, the airflow outlet 10 includes the first shut-off door 22 and the second shut-off door 24. The first shut-off door 22 and the second shut-off door 24 are configured to operatively meter the flow of air through the inlet opening 44. The first shut-off door 22 and the second shut-off door 24 are further configured to occupy a selectable operating position 152, 154, 156. In short, the amount of air flowing through the substantially closed airflow path defined by the first housing 18 and the second housing 20 between the inlet opening 44 and the outlet opening 28 is controlled by the position of the first shut-off door 22 and the second shut-off door 24.

The first shut-off door 22 has a first door first edge 56, a first door second edge 58, a first door first side 60, and a first door second side 62. The first shut-off door 22 further includes a first door seal 64. The first door seal 64 has a first edge 66, a second edge 68, a first side 70, and a second side 72. The first door seal 64 may be formed of a rubberized or other frictional material. The first edge 66 of the first door seal 64 is coupled to and fitted about the first door second edge 58. The first shut-off door 22 is operatively coupled to the second housing 20 at the first door first edge 56. The first door first edge 56 is disposed on a first axis 74, such that the first shut-off door 22 is rotatable about the first axis 74 at the first door first edge 56.

The second shut-off door 24 has a second door first edge 76, a second door second edge 78, a second door first side 80, and a second door second side 82. The second shut-off door 24 further includes a second door seal 84. The second door seal 84 has a first edge 86, a second edge 88, a first side 90, and a second side 92. The second door seal 84 may be formed of a rubberized or other frictional material. The first edge 86 of the second door seal 84 is coupled to and fitted about the second door second edge 78. The second shut-off door 24 is operatively coupled to the second housing 20 at the second door first edge 76. The second door first edge 76 is disposed on a second axis 94, such that the second shut-off door 24 is rotatable about the second axis 94 at the second door first edge 76.

Referring to FIGS. 2 and 4-8, the control apparatus 26 is configured to control the selectable operating position 152, 154, 156 of the first shut-off door 22 and the selectable operating position of the second shut-off door 24, thereby allowing a passenger within the passenger compartment 14 to control the airflow through the airflow outlet 10. The passenger may meter the amount of air flowing through the airflow outlet 10, i.e., through the inlet opening 44 and ultimately out the outlet opening 28 and into the passenger compartment 14, via the control apparatus 26.

The control apparatus 26 may include a drive element 96, a driven element 98, a control linkage 100, a linkage connector 102, and a control wheel 104. The control wheel 104 may be utilized as a user input allowing a passenger to control the airflow through the airflow outlet 10. The control wheel 104 may include a central portion 114, a touch pad portion 116, and a flange portion 118 extending outwardly from the central portion 114. The central portion 114 of the control wheel 104 may define a central bore 120 therein.

The control wheel 104 may be mounted to the exterior of the first housing 18 via a receiver 122. The receiver 122 may be coupled to or mounted on the exterior of the first housing 18. The receiver 122 may have a first end 123, a second end 125, a mounted side 124 and a receiver side 126. The receiver side 126 may include an extension 128 that extends outwardly from the first housing 18 and is aligned on a third axis 130. When the control wheel 104 is coupled to the receiver 122 the extension 128 is inserted into the central bore 120, such that the control wheel 104 is disposed on and rotatable about the third axis 130. The control wheel 104 is further positioned on the receiver 122, such that the touch pad portion 116 is disposed nearest the first end 123 and faces toward the outlet opening 28.

A controller faceplate 132 may be coupled to the receiver 122 at the receiver first end 123. The controller faceplate 132 is generally flush with the surrounding structure, for example, a dashboard 16 (FIG. 1) into which the airflow outlet 10 is mounted. The controller faceplate 132 has a first side 134 and a second side 136 and defines a slot 138 therethrough. When the control wheel 104 is coupled to the receiver 122, the control wheel 104 is positioned within the slot 138 of the contoller faceplate 132, such that the touch pad portion 116 of the control wheel 104 is positioned on the first side 134 of the controller faceplate 132 and the flange portion 118 of the control wheel 104 is positioned on the second side 136 of the controller faceplate 132. In short, the touch pad portion 116 is positioned on the first side 134 of the controller faceplate 132, so that it is accessible to a passenger within the passenger compartment 14.

The control linkage 100 may be a rigid member having a first end 140 and a second end 142. The control linkage 100 is operable to connect the control wheel 104 with the remainder of the control apparatus 26, such that a user input on the touch pad portion 116 of the control wheel 104 may be translated to the first shut-off door 22 and the second shut-off door 24. As such, the first end 140 of the control linkage 100 is operatively coupled to the flange portion 118 of the control wheel 104. The second end 142 of the control linkage 100 is operatively coupled to the linkage connector 102.

The linkage connector 102 has a first end 110 and a second end 112. The first end 110 of the linkage connector 102 is operatively coupled to the drive element 96 and the first shut-off door 22. The first end 110 of the linkage connector 102 is positioned along the first axis 74 between the first shut-off door 22 and the drive element 96, such that the linkage connector 102 is rotatable about the first axis 74. In operation, the second end 112 of the linkage connector 102 rotates about the first axis 74 proportionally and in unison with each of the drive element 96 and the first shut-off door 22.

The drive element 96 may be a gear or the like having a connection portion 106 and an engagement portion 108. The drive element 96 is shown in the Figures as a partial spherical gear, namely a one-quarter section of a spherical gear, such a configuration allows the reduction of the overall height of the airflow outlet 10. The drive element 96 is operatively coupled to the first shut-off door 22 at the connection portion 106, such that the connection portion 106 is positioned on and rotatable about the first axis 74. The drive element 96 is configured to rotate the first shut-off door 22 about the first axis 74 to the selected operating position 152, 154, 156, i.e., the position indicated by a user input on the touch pad portion 116 of the control wheel 104.

The driven element 98 may be substantially identical to the drive element 96. As such, the driven element 98 may be a gear or the like having a connection portion 144 and an engagement portion 146. The driven element 98 is shown in the Figures as a partial spherical gear, namely a one-quarter section of a spherical gear, as such a configuration allows the reduction of the overall height of the airflow outlet 10. The driven element 98 is operatively coupled to the second shut-off door 24 at the driven element connection portion 146, such that the driven element connection portion 146 is positioned on and rotatable about the second axis 94. The driven element 98 is operatively engaged with the drive element 96. The engagement between the drive element 96 and the driven element 98 may be a mechanical engagement such as gearing, a frictional engagement between the drive element 96 composed of a frictional material and the driven element 98 composed of a frictional material, or a similar mechanical-type engagement. In any sense, the drive element 96 and the driven element 98 are engaged in such a way that a rotation of the drive element 96 about the first axis 74 causes a proportional and rotationally opposite rotation of the driven element 98 about the second axis 94. The driven element 98 is configured to rotate the second shut-off door 24 about the second axis 94 to the selected operating position 152, 154, 156, i.e., the position corresponding to that of the first shut-off door 22.

Figure 6:
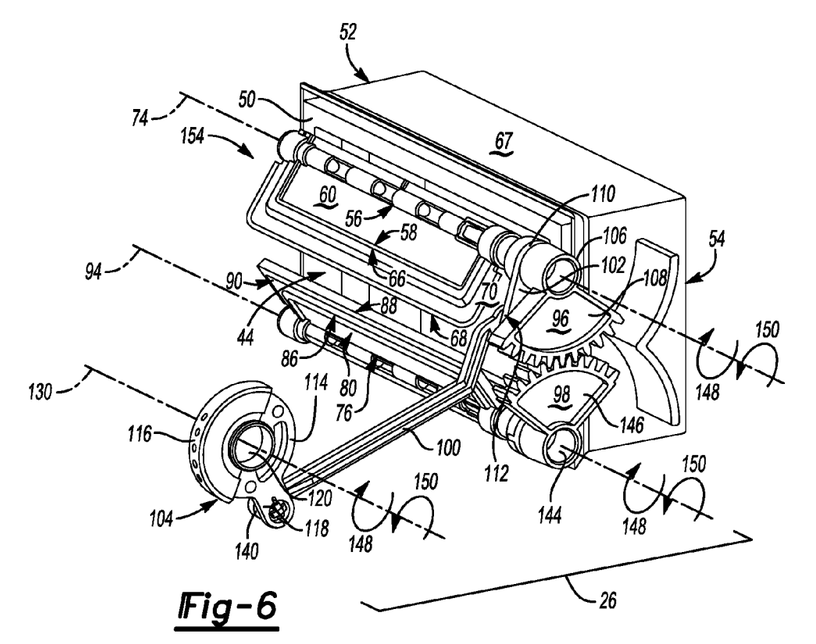
FIG. 6 is a partial schematic perspective view of the airflow outlet of the present disclosure, wherein the first shutoff door and the second shutoff door occupy a second position.
Figure 7:
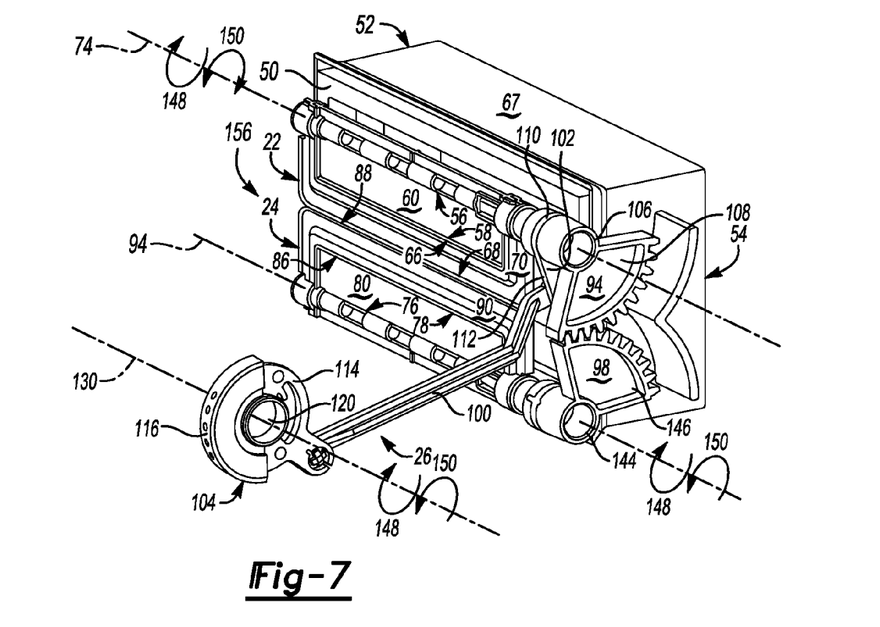
FIG. 7 is a partial schematic perspective view of the airflow outlet of the present disclosure, wherein the first shutoff door and the second shutoff door occupy a third position.

As shown by the examples in FIGS. 4-8 the user or vehicle passenger may desire more or less airflow through the airflow outlet 10. Thus, the first shut-off door 22 and the second shut-off door 24 must be actuated to a selectable operating position 152, 154, 156 via the control apparatus 26 to effectuate the desired amount of airflow through the airflow outlet 10. As such, the selectable operating position 150, 152, 154 of each of the first shut-off door 22 and the second shut-off door 24 defines the amount of airflow through the substantially closed airflow path between the inlet opening 44 and the outlet opening 28 formed by the first housing 18 and second housing 20. Depending on the selected operating position 150, 152, 154 of the first shut-off door 22 and the second shut-off door 24, the airflow path may be, for example, fully open 150 (FIGS. 4 and 5), partially open 152 (FIG. 6), or fully closed 154 (FIGS. 7 and 8).

More particularly, a directional actuation and/or rotation of the control wheel 104 about the third axis 130 in a specified direction results in a proportional rotation of the drive element 96 in the same specified direction and a proportional rotation of the driven element 98 in a rotationally opposite direction. Such a rotation of the control wheel 104, the drive element 96, and the driven element 98 results in a proportional rotation of the first shut-off door 22 in the direction of rotation of the drive element 96 and a proportional rotation of the second shut-off door 24 in the direction of rotation of the driven element 98 to thereby actuate the respective shut-off doors 22, 24 to the desired selectable operating position 152, 154, 156.

Specifically, when the control wheel 104 is rotated by a user or passenger in a first direction 148, such a rotation is transferred to the control linkage 100 and subsequently to the linkage connector 102, causing the linkage connector 102 to rotate about the first axis 74 in a first direction 148. The rotation of the linkage connector 102 causes the substantially equivalent rotation of the drive element 96 and the first shut-off door 22 operatively coupled thereto in the first direction 148 about the first axis 74. The rotation of the drive element 96 in the first direction 148 causes a substantially equivalent rotation of the driven element 98, and the second shut-off door 24 operatively coupled thereto, in a rotationally opposite second direction 150 about the second axis 94 due to the mechanical engagement between the drive element 96 and the driven element 98.

Specifically, when the control wheel 104 is rotated by a user or passenger in the second direction 150, such a rotation is transferred to the control linkage 100 and subsequently to the linkage connector 102, causing the linkage connector 102 to rotate about the first axis 74 in the second direction 150. The rotation of the linkage connector 102 causes the substantially equivalent rotation of the drive element 96 and the first shut-off door 22 operatively coupled thereto in the second direction 150 about the first axis 74. The rotation of the drive element 96 in the second direction 150 causes a substantially equivalent rotation of the driven element 98, and the second shut-off door 24 operatively coupled thereto, in a rotationally opposite first direction 148 about the second axis 94 due to the mechanical engagement between the drive element 96 and the driven element 98.

In one example embodiment shown in FIGS. 4-8, the user or vehicle passenger may desire maximum airflow through the airflow outlet 10 (FIGS. 4-5), intermediate airflow through the airflow outlet 10 (FIG. 6), or no airflow through the airflow outlet 10 (FIGS. 7-8). Accordingly, the selectable operating position 152, 154, 156 may be one of a first position 152 (FIGS. 4-5), a second position 154 (FIG. 6), and a third position 156 (FIGS. 7-8).

Figure 4:
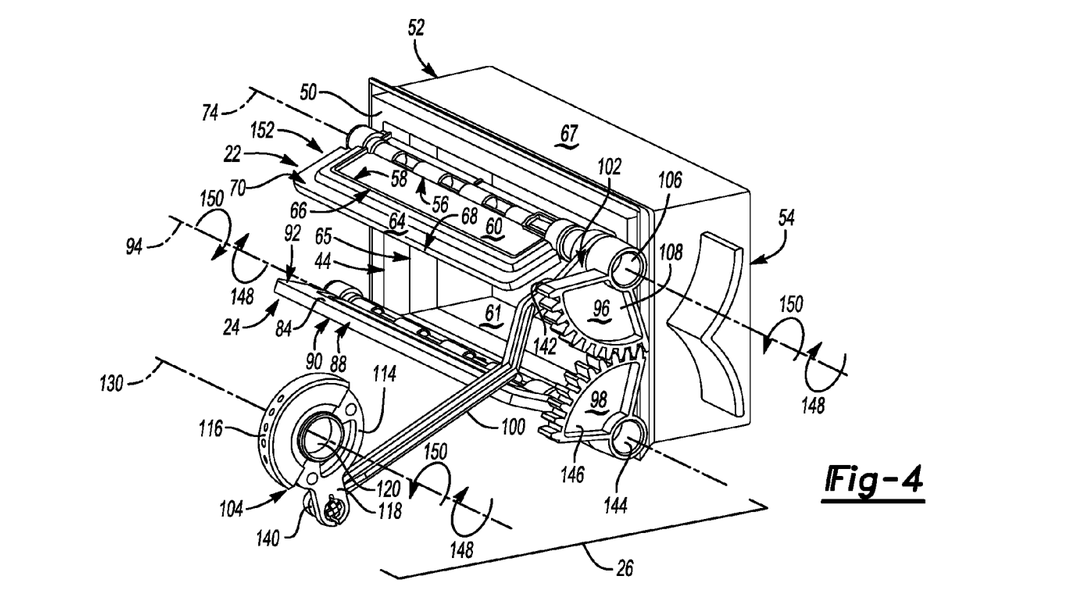
FIG. 4 is a partial schematic perspective view of the airflow outlet of the present disclosure, wherein the first shutoff door and the second shutoff door occupy a first position.

The first position 152, shown in FIGS. 4-5, may be a fully open position allowing the maximum amount of airflow through the airflow outlet 10. In the first position 152, the control wheel 104 is fully rotated in the first direction 148, and, as such the drive element 96 and the first shut-off door 22 are fully rotated in the first direction 148, such that the first door first side 60 is positioned to abut the first wall 36 of the second housing 20. Further, in the first position 152, the control wheel 104 and drive element 96 are fully rotated in the first direction 148, and, as such the driven element 98 and the second shut-off door 24 are fully rotated in the second direction 150, such that the second door first side 80 is positioned to abut the second wall 38 of the second housing 20. In the first position 152, the inlet opening 44 is fully open.

The second position 154, shown in FIG. 6, may be a mid-open position allowing an intermediate amount of airflow through the airflow outlet 10. In the second position 154, the first shut-off door 22 is obliquely angled with respect to the first wall 36 of the second housing 20 and the second shut-off door 24 is obliquely angled with respect to the second wall 38 of the second housing 20, such that the inlet opening 44 is partially blocked by the first shut-off door 22 and the second shut-off door 24.

In order to transition the airflow outlet 10 from the first position 152 to the second position 154, in the example embodiment, the user or vehicle passenger may rotate the control wheel 104 approximately twelve degrees (12°) in the second direction 150, which results in about a thirty-five degree (35°) rotation of the first shut-off door 22 about the first axis 74 in the second direction 150 and a thirty-five degree (35°) rotation of the second shut-off door 24 about the second axis 94 in the first direction 148.

In order to transition the airflow outlet 10 from the second position 154 to the first position 152, in the example embodiment, the user or vehicle passenger may rotate the control wheel 104 approximately twelve degrees (12°) in the first direction 148, which results in about a thirty-five degree (35°) rotation of the first shut-off door 22 about the first axis 74 in the first direction 148 and a thirty-five degree (35°) rotation of the second shut-off door 24 about the second axis 94 in the second direction 150.

The third position 156, shown in FIGS. 7-8, may be a fully closed position, wherein the inlet opening 44 is fully obstructed by the first shut-off door 22, the second shut-off door 24, the first door seal 64, and the second door seal 84, which completely block airflow through the inlet opening 44 and through the airflow outlet 10. In the third position 156, the first shut-off door 22 is positioned such that the second side 72 of the first door seal 64 abuts and is in contact with the each of the plurality of flange members 46a, 46b. Further, in the third position 156, the second shut-off door 24 is positioned such that the second side 92 of the second door seal 84 abuts and is in contact with each of the plurality of flange members 46a, 46b. Additionally, in the third position 156, the first shut-off door 22 and the second shut-off door 24 are positioned such that the second edge 68 of the first door seal 64 abuts and is in contact with the second edge 88 of the second door seal 84.

In order to transition the airflow outlet 10 from the second position 154 to the third position 156, in the example embodiment, the user or vehicle passenger may rotate the control wheel 104 approximately twenty 26 degrees (26°) in the second direction 150, which results in about a thirty-five degree (35°) rotation of the first shut-off door 22 about the first axis 74 in the second direction 150 and a thirty-five degree (35°) rotation of the second shut-off door 24 about the second axis 94 in the first direction 148.

In order to transition the airflow outlet 10 from the third position 156 to the second position 154, in the example embodiment, the user or vehicle passenger may rotate the control wheel 104 approximately twenty six degrees (26°) in the first direction 148, which results in about a thirty-five degree (35°) rotation of the first shut-off door 22 about the first axis 74 in the first direction 148 and a thirty-five degree (35°) rotation of the second shut-off door 24 about the second axis 94 in the second direction 150.

In order to transition the airflow outlet 10 from the first position 152 to the third position 156, in the example embodiment, the user or vehicle passenger may rotate the control wheel 104 approximately thirty-eight degrees (38°) in the second direction 150, which results in about a seventy degree (70°) rotation of the first shut-off door 22 about the first axis 74 in the second direction 150 and a seventy degree (70°) rotation of the second shut-off door 24 about the second axis 94 in the first direction 148.

In order to transition the airflow outlet 10 from the third position 156 to the first position 152, in the example embodiment, the user or vehicle passenger may rotate the control wheel 104 approximately thirty-eight degrees (38°) in the first direction 148, which results in about a seventy degree (70°) rotation of the first shut-off door 22 about the first axis 74 in the first direction 148 and a seventy degree (70°) rotation of the second shut-off door 24 about the second axis 94 in the second direction 150.

While the best modes for carrying out the invention have been described in detail, those familiar with the art to which this invention relates will recognize various alternative designs and embodiments for practicing the invention within the scope of the appended claims.

The invention claimed is:
1. An airflow outlet comprising:
a first housing defining an outlet opening;
a second housing having at least a first wall and a second wall, a first side wall, a second side wall positioned opposite the first side wall, and a plurality of flange members, wherein the second housing defines an inlet opening between the first wall and the second wall, wherein at last one of the plurality of flange members extends from the first side wall and into the inlet opening and at least one of the plurality of flange members extends from the second side wall and into the inlet opening, and wherein the first housing and the second housing are coupled, such that the first housing and the second housing define a substantially closed airflow path between the inlet opening and the outlet opening;
a first shut-off door having a first door first edge, a first door second edge, a first door first side, and a first door second side, the first shut-off door being operatively coupled to the second housing at the first door first edge, such that the first door first edge is rotatable about a first axis;
a first door seal having a first edge, a second edge, a first side, and a second side, such that the first edge of the first door seal is coupled to and fitted about the first door second edge;
a second shut-off door having a second door first edge, a second door second edge, a second door first side, and a second door second side, the second shut-off door being operatively coupled to the second housing at the second door first edge, such that the second door first edge is rotatable about a second axis;
a second door seal having a first edge, a second edge, a first side, and a second side, such that the first edge of the second door seal is coupled to and fitted about the second door second edge;
a control apparatus configured to control a selectable operating position of the first shut-off door and a selectable operating position of the second shut-off door;
wherein the first shut-off door and the second shut-off door are configured to occupy selectable operating positions, such that the first shut-off door and the second shut-off door operatively meter a flow of air through the inlet opening, wherein the selectable operating position of the first shut-off door and the second shut-off door is one of a first position, a second position, and a third position; and
wherein in the third position the first shut-off door is positioned such that the second side of the first door seal abuts and is in contact with each of the plurality of flange members, the second shut-off door is positioned such that the second side of the second door seal abuts and is in contact with each of the plurality of flange members, the first shut-off door and the second shut-off door are positioned such that the second edge of the first door seal abuts and is in contact with the second edge of the second door seal, and the inlet opening is fully blocked by the first shut-off door, the second shut-off door, the first door seal, and the second door seal, such that there is no airflow through the inlet opening.

2. The airflow outlet of claim 1 wherein the control apparatus includes:
a drive element operatively coupled to the first shut-off door and rotatable about the first axis, wherein the drive element is configured to rotate in unison with the first shut-off door about the first axis;
a driven element operatively coupled to the second shut-off door and rotatable about the second axis, the driven element being operatively engaged with the drive element such that a rotation of the drive element about the first axis causes a proportional rotation of the driven element about the second axis, wherein the driven element is configured to rotate in unison with the second shut-off door about the second axis; and
wherein the driven element is mechanically engaged with the drive element.

3. The airflow outlet of claim 2 wherein the control apparatus further includes:
a control wheel rotatable about a third axis, the control wheel having a touch pad portion, a central portion, and a flange portion extending outwardly from the central portion, and wherein the central portion of the control wheel defines a central bore therein; and a control linkage having a first end and a second end, the first end being operatively coupled to the flange portion of the control wheel and the second end being operatively coupled with the drive element.

4. The airflow outlet of claim 3 further including:
a receiver coupled to the first housing, wherein the receiver is configured to couple the control wheel with the first housing; and
a controller faceplate coupled to the receiver and the first housing, the controller faceplate having a first side and a second side and defining a slot therein, wherein the control wheel is positioned within the slot, such that the touch pad portion of the control wheel is positioned on the first side of the controller faceplate and the flange portion of the control wheel is positioned on the second side of the controller faceplate.

5. The airflow outlet of claim 3 wherein the control apparatus further includes a linkage connector positioned along the first axis between the first shut-off door and the drive element, the linkage connector being operatively coupled to and rotatable in unison with each of the drive element and the first shut-off door, and wherein the second end of the control linkage is coupled to the linkage connector.

6. The airflow outlet of claim 5 wherein:
a rotation of the control wheel about the third axis in a first direction causes a rotation of the drive element and the first shut-off door operatively coupled thereto in the first direction about the first axis and a rotation of the driven element and the second shut-off door operatively coupled thereto in a second direction about the second axis; and
a rotation of the control wheel in a second direction about the third axis causes a rotation of the drive element and the first shut-off door operatively coupled thereto in the second direction about the first axis and a rotation of the driven element and the second shut-off door operatively coupled thereto in a first direction about the second axis.

7. The airflow outlet of claim 6 wherein:
the second direction is rotationally opposite of the first direction;
the rotation of the drive element in the first direction is substantially equivalent to the rotation of the driven element in the rotationally opposite second direction; and
the rotation of the drive element in the second direction is substantially equivalent to the rotation of the driven element in the rotationally opposite first direction.

8. The airflow outlet of claim 1 wherein in the first position the first door first side abuts the first wall of the second housing and the second door first side abuts the second wall of the second housing.

9. The airflow outlet of claim 1 wherein in the second position the first shut-off door is obliquely angled with respect to the first wall of the second housing and the second shut-off door is obliquely angled with respect to the second wall of the second housing.

10. The airflow outlet of claim 1 wherein:
the first housing houses at least one primary directional vane therein, such that the at least one primary directional vane extends across the outlet opening;
the second housing houses a plurality of secondary directional vanes therein, such that the secondary directional vanes are arranged in series between the first side wall and the second side wall; and the at least one primary directional vane and the plurality of secondary directional vanes define an airflow direction through the airflow outlet.

11. The airflow outlet of claim 1 further including:
a trim piece positioned about the second housing at the inlet opening;
a duct defining a duct inlet and a duct outlet, wherein the duct is fitted about the trim piece and the second housing at the duct outlet, wherein the duct, the second housing, and the first housing are coupled, such that the duct, the second housing, and the first housing define a substantially closed airflow path between the duct inlet and the outlet opening.

12. A vehicle comprising:
a passenger compartment;
a plurality of airflow outlets positioned within the passenger compartment to facilitate the heating, cooling, and ventilation of the passenger compartment, each of the plurality of airflow outlets including:
 a first housing defining an outlet opening;
 a second housing having at least a first wall, a second wall, and two opposing side walls, and a plurality of flange members, such that the second housing defines an inlet opening between the first wall, the second wall, and the two opposing side walls, wherein one of the plurality of flange members extends from one of the opposing side walls and into the inlet opening, and wherein another of the plurality of flange members extends from the other opposing side wall and into the inlet opening;
 a first shut-off door having a first door first edge, a first door second edge, a first door first side, and a first door second side, the first shut-off door being operatively coupled to the second housing at the first door first edge, such that the first door first edge is rotatable about a first axis;
 a first door seal having a first edge, a second edge, a first side, and a second side, such that the first edge of the first door seal is coupled to and fitted about the first door second edge;
 a second shut-off door having a second door first edge, a second door second edge, a second door first side, and a second door second side, the second shut-off door being operatively coupled to the second housing at the second door first edge, such that the second door first edge is rotatable about a second axis;
 a second door seal having a first edge, a second edge, a first side, and a second side, such that the first edge of the second door seal is coupled to and fitted about the second door second edge;
 a control apparatus configured to control a selectable operating position of the first shut-off door and a selectable operating position of the second shut-off door, the control apparatus including:
  a drive element operatively coupled to the first shut-off door and rotatable in unison with the first shut-off door about the first axis;
  a driven element mechanically engaged with the drive element, such that the driven element is operatively coupled to the second shut-off door and rotatable in unison with the second shut-off door about the second axis, the driven element operatively engaged with the drive element such that a rotation of the drive element about the first axis causes a proportional rotation of the driven element about the second axis;
  a control wheel rotatable about a third axis, having a touch pad portion and a flange portion, the control wheel further defining a central bore therein, such that the flange portion extends outwardly from the central bore;
  a control linkage having a first end and a second end, the first end being operatively coupled to the flange portion of the control wheel; and
  a linkage connector positioned along the first axis between the first shut-off door and the drive element, the linkage connector being operatively coupled to and rotatable in unison with each of the driven element and the first shut-off door, and wherein the second end of the control linkage is coupled to the linkage connector;
 wherein the first housing and the second housing are coupled, such that the first housing and the second housing define a substantially closed airflow path between the inlet opening and the outlet opening; and
 wherein the first shut-off door and the second shut-off door are configured to occupy selectable operating positions, such that the first shut-off door and the second shut-off door operatively meter a flow of air through the inlet opening.

13. The vehicle of claim 12 wherein:
a rotation of the control wheel about the third axis in a first direction causes a rotation of the drive element and the first shut-off door operatively coupled thereto about the first axis in the first direction and a rotation of the driven element and the second shut-off door operatively coupled thereto about the second axis in a second direction; and
a rotation of the control wheel about the third axis in a second direction causes a rotation of the drive element and the first shut-off door operatively coupled thereto about the first axis in the second direction and a rotation of the driven element and the second shut-off door operatively coupled thereto about the second axis in a first direction.

14. The vehicle of claim 13 wherein:
the second direction is rotationally opposite of the first direction;
the rotation of the drive element in the first direction is substantially equivalent to the rotation of the driven element in the rotationally opposite second direction; and
the rotation of the drive element in the second direction is substantially equivalent to the rotation of the driven element in the rotationally opposite first direction.

15. The vehicle of claim 14 wherein the selectable operating position is a first position, such that the first door first side abuts the first wall of the second housing and the second door first side abuts the second wall of the second housing.

16. The vehicle of claim 14 wherein the selectable operating position is a second position, such that the first shut-off door is obliquely angled with respect to the first wall of the second housing and the second shut-off door is obliquely angled with respect to the second wall of the second housing.

17. The vehicle of claim 14 wherein the selectable operating position is a third position, and wherein:
the first shut-off door is positioned such that the second side of the first door seal abuts and is in contact with the each of the plurality of flange members;
the second shut-off door is positioned such that the second side of the second door seal abuts and is in contact with the each of the plurality of flange members;

the first shut-off door and the second shut-off door are positioned such that the second edge of the first door seal abuts and is in contact with the second edge of the second door seal; and the inlet opening is fully blocked by the first shut-off door, the second shut-off door, the first door seal, and the second door seal, such that there is no airflow through the inlet opening.

\* \* \* \* \*